United States Patent
Nübel et al.

(10) Patent No.: US 7,931,429 B2
(45) Date of Patent: Apr. 26, 2011

(54) HEADER TRAILER

(76) Inventors: Thomas Nübel, Beverungen (DE); Attila Göblyös, Törökszentmiklós (HU)

(*) Notice: Subject to any disclaimer, the term of this patent is extended or adjusted under 35 U.S.C. 154(b) by 25 days.

(21) Appl. No.: 12/237,630

(22) Filed: Sep. 25, 2008

(65) Prior Publication Data
US 2009/0189382 A1 Jul. 30, 2009

(30) Foreign Application Priority Data

Sep. 26, 2007 (DE) .......................... 10 2007 046 184

(51) Int. Cl.
*B60P 3/40* (2006.01)
(52) U.S. Cl. .................... 410/44; 280/781; 280/405.1
(58) Field of Classification Search ............... 280/405.1, 280/789, 781
See application file for complete search history.

(56) References Cited

U.S. PATENT DOCUMENTS

| | | | | |
|---|---|---|---|---|
| 4,371,299 A * | 2/1983 | Cain et al. | ...... | 410/44 |
| 5,031,394 A * | 7/1991 | Honey | ...... | 56/228 |
| 5,333,904 A * | 8/1994 | Kuhns | ...... | 280/789 |
| 5,374,082 A * | 12/1994 | Smith | ...... | 280/789 |
| 6,419,431 B1 * | 7/2002 | Kuhns | ...... | 410/2 |
| 6,428,047 B1 * | 8/2002 | Kaderabek | ...... | 280/789 |
| 7,205,490 B2 * | 4/2007 | Van Mill et al. | ...... | 177/136 |
| 7,326,013 B2 * | 2/2008 | Heuvel et al. | ...... | 410/44 |
| 7,413,210 B1 * | 8/2008 | Ross | ...... | 280/414.1 |
| 7,490,856 B1 * | 2/2009 | Kuhns | ...... | 280/789 |

* cited by examiner

*Primary Examiner* — Lesley Morris
*Assistant Examiner* — Tashiana Adams
(74) *Attorney, Agent, or Firm* — Christine Johnson, Esq; Johnson & Scaturro, LLC

(57) ABSTRACT

A header trailer for transporting a header for a combine harvester has a chassis (1-4) and a support saddle (12) which is shaped so as to support stably a header (16) placed on the support saddle (12). The support saddle is mounted pivotably on the chassis (1-4).

14 Claims, 2 Drawing Sheets

HEADER TRAILER

CROSS REFERENCE TO RELATED APPLICATIONS

This application claims priority to German National Application Serial Number 10 2007 046 184.6 filed Sep. 26, 2007 to assignee Claas Selbstfahrende Erntemaschinen GmbH Munsterstr. 33428 Harsewinkle, Germany.

FIELD OF THE INVENTION

The present invention relates to a header trailer for transporting a header for a combine harvester.

BACKGROUND OF THE INVENTION

The headers of modern combine harvesters mostly have a width of many meters, so that a combine harvester with mounted header is too wide to use public roads. A header trailer is therefore required in order to transport the header separately from the combine harvester on public roads.

Known from DD 301 470 A7 is a header trailer with a chassis and a support saddle mounted on the chassis which is shaped so as to support a header placed on it stably during transportation. The shape of the support saddle is adapted to the type of header which is to be transported. In order to allow a header of a different type to be transported, it is suggested that an additional support be used which can be placed on the support saddle and which is adapted to the shape of the second type of header in order to support the latter stably. Although such a trailer makes it possible to transport different types of header, a specific intermediate support is required for each additional type. Each type of header can only be transported in a single, predetermined orientation.

EP 0 045 039 B1 discloses a header trailer in which a support saddle is composed of several components which can be moved in relation to one another. Thus, the support saddle comprises, on the one hand, several carrying rails which can be pivoted between different positions in which headers of different types are, depending on the type, supported by one, the other or both carrying rails, and on the other hand a seating part with a fork-shaped receiving recess open at the top which can be raised in order to support a crossbar of the header or lowered in order to allow a rear section of the header to be placed in a supporting pocket adjacent to the receiving recess.

Although such a header trailer does not require any intermediate support in order for different types of headers to be transported, due to the construction design of the trailer the types of headers which can be transported are fixed from the outset. Also, each type of header can only be accommodated in a fixed orientation in relation to the trailer. In laden condition an adjustment of the moveable components of the support saddle is not possible.

U.S. Pat. No. 4,834,598 discloses a header trailer in which a horizontally adjustable stop is attached to one end of a crossmember of the chassis and an arm which is vertically and transversely adjustable is attached to the other end in order to allow different types of header to be supported. Here too, as a rule, for each type of header only one position of the arm exists in which the header is stably supported, and the position of the header in relation to the chassis is fixed.

All of these known header trailers can be adjusted in their form so that a particular combine harvester can set down a header associated with it in a secure storage position and pick it up again from the trailer. However, they fail to take into account that operators who have several combine harvesters in use may wish to use the same header on different combine harvesters of different types. The problem which arises here is that the intake channels of the combine harvesters to which the headers need to be fitted can, in different types, have different orientations. Accordingly, the orientations in which the different types of combine harvester can gently set down the same header on a transport trailer, or pick it up again, may differ.

Regardless of the potentially different orientations of the intake channels further problems may result from the fact that in order to attach a header the intake channel must be introduced into a space between a trailer wheel and the header, and that the place requirement of the intake channel in this space may vary from one model to another. Generally, it is desired to locate the centre of gravity of the header as low as possible on the trailer and as close as possible to a longitudinal centre plane of the trailer, in order to achieve stable support of the header and a good handling of the trailer. If at the same time the insertion space for the intake channel is to be made as wide as possible, impairments have to be accepted concerning the position of the centre of gravity. A further problem results from the fact that the lateral overhang which the header may have over the edge of the trailer is subject to limitations by law. If the header is placed off-centre so as to make the space for the intake channel wide, the side of the header opposite to the intake channel may have an inadmissibly wide overhang.

SUMMARY OF THE INVENTION

An object of the present invention is to create a header trailer which takes into account this circumstance in that it allows the same header to be picked up or set down in different positions or orientations.

DETAILED DESCRIPTION OF THE INVENTION

The problem is solved in one example embodiment of the invention, means of a header trailer with a chassis and a support saddle which is shaped so as to support a header placed on the support saddle stably and which is movably mounted on the chassis.

In the interest of a quick and reproducible adjustment of the support saddle it is useful if the latter is displaceably guided on the chassis with a single degree of freedom of motion. For adapting the width of the space between a wheel of the trailer and the header to the place requirement of different types of intake channels it can be sufficient if the support saddle is merely displaceable, preferably transversally with respect to the direction of motion of the trailer. However, a purely translational movement also implies a substantial displacement of the centre of gravity of the header on the trailer, so that in an unfavourable position of the header the handling of the trailer is impaired, more specifically the highest speed at which the trailer can be safely hauled is reduced. In order to avoid this, the degree of freedom of motion preferably is a degree of freedom of a pivoting movement.

In order to minimize the dependency of the position of the centre of gravity of the header on the position of the support saddle a—at least instantaneous—pivoting axis of the pivoting movement preferably extends above the support saddle.

Generally the dependence of the position of the centre of gravity on the position of the support saddle is the smaller, the closer the pivoting axis is to the centre of gravity. According to the invention the distance of the pivoting axis from the centre of gravity of a header placed on the support saddle should be smaller than a third of the distance between a support point of the header on the support saddle and the centre of gravity of the header.

In the simplest case, such a header trailer makes it possible to adjust the position of the support saddle to the orientation in which a combine harvester can set down the header on the saddle, so that the header is supported by the support saddle in the same orientation in which it is held by the combine harvester. In this way, an uncontrolled tipping of the header can be prevented, which, conventionally, can happen if, in particular, the header has to be uncoupled from the combine harvester in a position in which, although it touches the support saddle and cannot be lowered further, it has not yet reached a stable position thereon. If, moreover, the support saddle can be moved with a pivoting motion when laden with the header, the orientation of the header resting on the header trailer can also be adapted to a combine harvester to which it is to be coupled, which makes it simpler and safer to attach the header to the combine harvester.

The support saddle is preferably inherently rigid and is only moveable as a whole in relation to the chassis. The support saddle can, in particular, comprise at least two support cradles spaced from one another in the direction of travel of the trailer and connected by struts extending in the direction of travel.

In order to mount the support saddle so that it can be moved in a pivoting motion, at least one of the support saddle and chassis possesses a guide contour, in particular a slot, and the other a contact body which can be slid along the guide contour transversely to the direction of travel, preferably a bolt which engages in the slot.

In order to actuate an adjustment of the support saddle, a positioning member acting parallel to the guide contour engaging with the chassis on the one hand and with the support saddle on the other can be provided.

According to a first embodiment, the support saddle is guided by means of two guide contours and contact bodies which can be moved along these, whereby a first guide contour slopes down towards a longitudinal centre plane of the vehicle and the second guide contour extends at a narrower angle to the horizontal than the first. The different orientation of the guide contours guarantees that when the support saddle is slid along the guide contours it performs a tipping movement. Advantageously, the side of a header which is to be fixed to the combine harvester is placed on the support saddle adjacent to the second guide contour, so that the height at which the header is set down on the support saddle or can be lifted off it depends little on the position of the support saddle in relation to the chassis.

According to a second embodiment, the pivoting movement of the support saddle is guided with the help of at least one rocker arm, which is connected in an articulated manner with the support saddle and the chassis. This rocker arm is preferably oriented so as to angle up towards a longitudinal centre plane of the vehicle.

According to a further embodiment, the support saddle and chassis can also be connected via an elbow lever, on the elbow of which a positioning member acts. Further features and advantages of the invention are explained in the following description of illustrative embodiments, with reference to the attached figures, in which.

Figure 1:
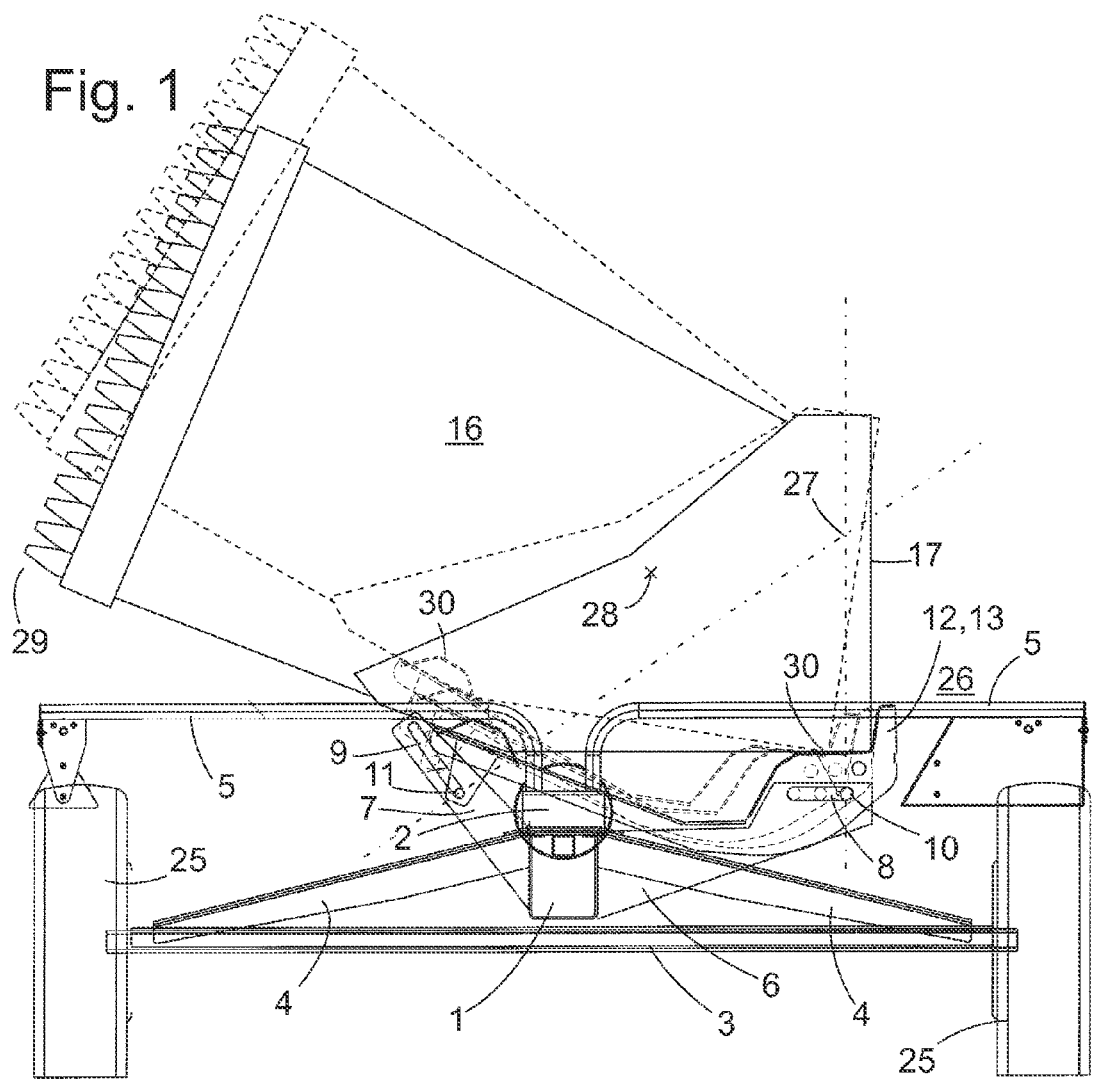
FIG. 1 shows a frontal view of a header trailer in accordance with a first embodiment of the invention with a header, diagrammatically represented, loaded on it.
Figure 2:
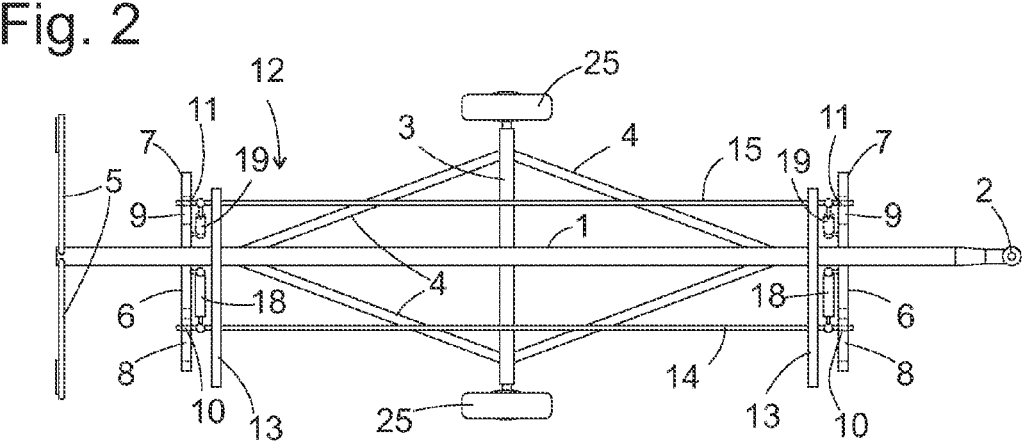
FIG. 2 shows a top view of the header trailer from FIG. 1.

The header trailer illustrated in FIGS. 1 and 2 has a chassis with a longitudinal chassis beam 1, which is bent upwards at its front end and terminates in a coupling 2 for connection to a towing vehicle. The towing vehicle can, in particular, be the combine harvester itself which is to use a header transported on the header trailer.

The longitudinal chassis beam 1 is supported in the centre by an axle 3 with wheels 25. Diagonal struts 4 connect the longitudinal chassis beam 1 and the axle 3 to form a rigid frame. Due to the central placement of axle 3 the intake channel of a combine harvester must be raised above the height of wheels 25 in order to couple to the header, and a space 26 between the right wheel 25 and the header must be large enough for the intake channel.

Arms 5 projecting from a rear end of the longitudinal chassis beam 1 carry reflectors or lamps, a number plate and if necessary warning signs. Two arms 6, 7 project from the front and back of the longitudinal chassis beam 1, one of which, identified with 6, is substantially horizontal in alignment and is provided with a horizontal slot 8, while the other, shorter arm 7, rising from the longitudinal chassis beam 1 at a steeper angle, possesses a slot 9 rising in an outwards direction. As can be seen, in particular, in FIG. 2, guide pins 10, 11 of a support saddle 12, which is provided in order that a header can be placed stably on it, extend through the slots 8, 9. In the present case the support saddle 12 consists of two support cradles 13 of plate-like form oriented transversely to the direction of travel or parallel to the arms 5, 6, the upper edges of which are adjusted to the shape of the header which is to be transported in order to support the header at least two points 30 spaced as far apart from each other as possible and thus to provide it with a positionally-stable support. The two support cradles 13 are rigidly connected with one another, in the present case by two bars 14, 15, the ends of which also form the guide pins 10, 11. Naturally, more than two support cradles 13 and further, in particular diagonally-oriented, struts between the support cradles 13 can be provided in addition.

The guide pins 10, 11 can be slid within the slots 8, 9, so that the support saddle 12, and with it a header 16 resting on it, can assume different positions. Two of these positions of the support saddle 12 and of the header 16, which correspond respectively to stop positions of the guide pins 10, 11 at the ends of the slots 8, 9, are represented in FIG. 1 with solid and broken lines. An instantaneous pivoting axis 27 of the support saddle or of the header resting on it is defined by the intersection of two straight lines oriented perpendicular to the slots 8, 9 at the location of guide pins 10, 11 and shown in FIG. 1 as dash-dot lines for the configuration represented in solid lines. The orientation of slot 9 is set so that the height of the instantaneous pivoting axis 27 is between that of the lower edge 28 of a side of the header facing away from the combine harvester in the two configurations shown. This has the consequence that the lower edge 25 moves substantially only in the vertical direction between the two shown configurations, and the overhang of the header over left wheel 25 is independent of the orientation of support saddle 12.

Since a side 17 of the header 16 which is to be attached to the combine harvester rests on the support saddle 12 above the horizontal slots 8, the height of this side 17 is substantially the same in both of the positions shown; only the orientation is different. It is thus possible to adjust the position of the support saddle 12, before setting the header 16 down on it, to the orientation in which the header is attached to the combine harvester carrying it, so that when set down on the support cradles 13 it touches each of these at least two points at a distance from one another and is thus stably supported. In this way, the connection between header and combine harvester can be relieved of any forces so that it can be easily detached, and a tipping of the header into a position stably supported by the support saddle 12 is prevented when detaching it from the combine harvester.

Since the height of the side 17 of the header 16 which is to be attached to the combine harvester does not depend, or depends very little, on the position of the support saddle 12, the position of the centre of gravity of the header 16 also depends little on the position of the support saddle 12. In principle, therefore, the header 16 can be safely transported in any position of the support saddle 12.

If a certain dependence of the height of side 17 on the orientation of support saddle 12 can be accepted, slot 8 may have a downward slope towards the centre of the trailer, unlike what is shown in FIG. 1. In this way the instantaneous pivoting axis 27 is located closer to the centre of gravity 28 of the header, and the independence of the roadability of the trailer from the position of support saddle 12 is improved.

If the header 16 is to be picked up from the trailer by a combine harvester the intake channel of which is oriented differently to that of the combine harvester which has previously set down the header on the trailer, it can be necessary, depending on the relationship between the orientations of header and intake channel, first to connect both together at an upper or lower edge of the side 17 and to lift the header 16 somewhat, so that it assumes an orientation in which it can be completely attached to the intake channel. However, it is preferable if the orientation of the header 16 can already be adapted on the trailer itself to the combine harvester picking it up, by adjusting the support saddle 12. This can, for example, be accomplished with the aid of positioning members 18 which, as can be seen in the top view in FIG. 2, are each arranged between an arm 6 and the adjacent support cradle 13, parallel to the slot 8, and act on the arm 6 on the one hand and also on the support cradle or the guide pin 10 which is solidly connected with it. The positioning members 18 can be of any known kind, for example hydraulic cylinders, electric motors driving in rotation a threaded control rod, or similar. A manual drive can also be provided for the positioning members. Alternatively, positioning members 19, also acting on the guide pins 11 parallel to the slots 9, can be provided, as shown in broken lines in FIG. 2. Since the adjustment of the support saddle 12 has little effect on the height of the centre of gravity of the header resting on it, the adjustment requires only a small driving force.

Figure 3:
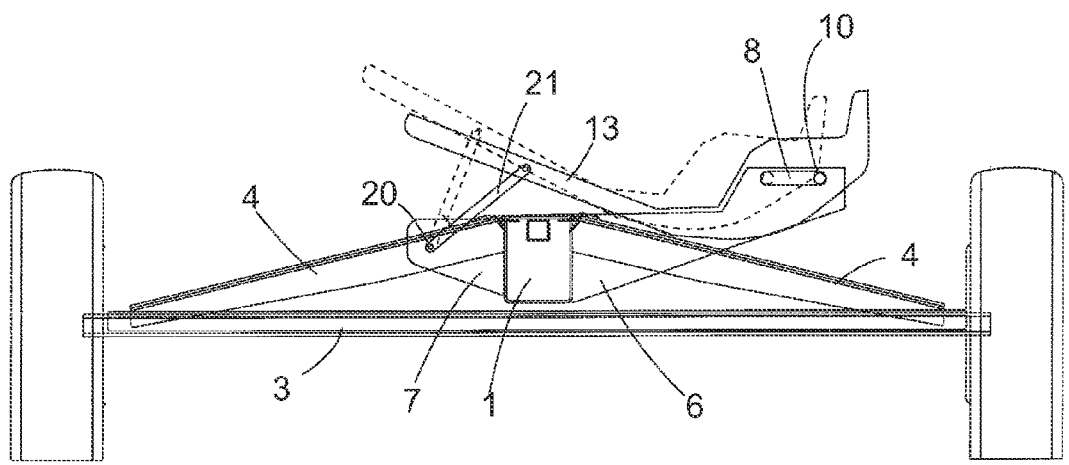
FIG. 3 shows a frontal view of a second embodiment analogous to FIG. 1.

FIG. 3 shows a second embodiment of the header trailer in accordance with the invention in a view analogous to that shown in FIG. 1, the coupling 2 and the arms 5 having been omitted to improve clarity. The arms 6 have the same form as in the first embodiment; on the arms 7, the slot 9 is replaced by an articulated joint 20 on which the end of a rocker arm 21 acts. The rocker arm 21 which is oriented so as to rise towards the centre of the trailer is connected at its other end, in an articulated manner, with one of the support cradles 13 of the support saddle 12. This structure makes possible an adjusting movement of the support saddle 12 similar to that in the first embodiment. A positioning member can act at an appropriate point between the chassis and the support saddle 12, but also between the rocker arm 21 on the one hand and the chassis or the support saddle on the other.

Figure 4:
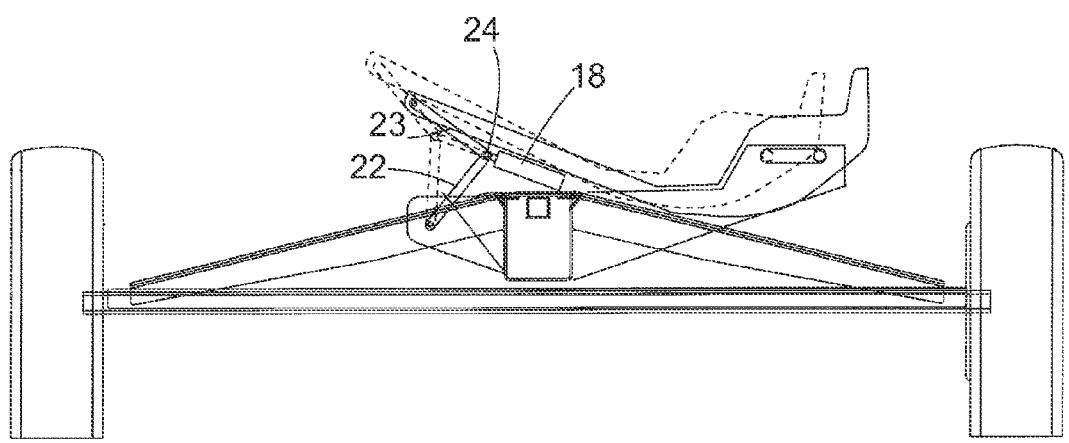
FIG. 4 shows a frontal view in accordance with a third embodiment.

In a third embodiment shown in FIG. 4, two rocker arms 22, 23, one of which is articulated to the arm 7 and the other to the support cradle 13, and which are connected together in an elbow joint 24, form an elbow lever. A positioning member 18 acts on the elbow joint 24 on the one hand and also on the chassis. In this embodiment, a relatively weak positioning member is sufficient to adjust the support saddle 12 and header 16, because the nearer the support saddle 12 comes to the stop position, which is shown in broken lines, the smaller becomes the ratio between the angle of rotation covered by the rocker arms 22, 23 and the adjustment travel of the positioning member.

The invention claimed is:

1. Header trailer for transporting a header for a combine harvester, with a chassis (1-4) including a central longitudinal chassis beam (1) and a support saddle (12), which is shaped so as to support stably a header (16) placed on the support saddle (12), characterised in that the support saddle (12) is movably mounted on the chassis to pivot with respect to the central longitudinal chassis beam (1-4).

2. Header trailer according to claim 1, characterised in that the support saddle (12) is guided at the chassis with a single degree of freedom of motion.

3. Header trailer according to claim 2, characterised in that the degree of freedom of motion is a degree of freedom of a pivoting movement.

4. Header trailer according to claim 3, characterised in that a pivoting axis of the pivoting movement extends above the support saddle (12).

5. Header trailer according to claim 4, characterised in that the distance of the pivoting axis (27) from the centre of gravity (28) of a header loaded on the support saddle is less than a third of the distance between the pivoting axis (27) and a support point (30) of the header on the support saddle (12).

6. Header trailer according to claim 1, characterised in that the support saddle (12) is inherently rigid.

7. Header trailer according to claim 1, characterised in that the support saddle (12) comprises at least two support cradles (13) which are spaced from one another in the direction of travel of the trailer and connected by struts (14, 15) extending in the direction of travel.

8. A header trailer for transporting a header for a combine harvester comprising:
a chassis;
a support saddle movably mounted on the chassis and shaped to support a header;
wherein at least one of the support saddle and the chassis includes a guide contour and the other includes a contact body which can be slid along the guide contour transversely to the direction of travel.

9. Header trailer according to claim 8, characterised by a positioning member acting, parallel to the guide contour on the chassis and also on the support saddle.

10. Header trailer according to claim 8, characterised in that the support saddle is guided by means of two guide contours and contact bodies which can be moved along the guide contours, whereby a first guide contour slopes down towards a longitudinal centre plane of the vehicle and the second guide contour extends at a narrower angle to the horizontal than the first guide contour.

11. Header trailer according to claim 1, characterised by at least one rocker arm (21) connected in an articulated manner with the support saddle (12) and the chassis (1-4).

12. Header trailer according to claim 11, characterised in that the rocker arm (21) is oriented so as to angle up towards a longitudinal centre plane of the trailer.

13. Header trailer according claim 1, characterised by at least one elbow lever (22-24) connected in an articulated manner with the support saddle (12) and the chassis (1-4) and a positioning member (18) acting on the elbow (24) of the elbow lever (22-24).

14. Header trailer according to claim 8, characterised in that the guide contour comprises a slot and the contact body comprises a bolt which engages in the slot.

* * * * *